United States Patent Office 3,459,699
Patented Aug. 5, 1969

3,459,699
DICYCLOPENTADIENE MODIFIED POLYMERS
Eli Levine, Hillside, N.J., and Philip C. Reuther, Springdale, Conn., assignors to Celanese Corporation, New York, N.Y., a corporation of Delaware
No Drawing. Filed Mar. 29, 1966, Ser. No. 538,235
Int. Cl. C08f 17/00, 1/60
U.S. Cl. 260—29.7                     6 Claims

ABSTRACT OF THE DISCLOSURE

A process for increasing the molecular weight of emulsion polymers by emulsion polymerizing unsaturated monomers in the presence of dicyclopentadiene.

This invention relates to the art of increasing the molecular weight of polymers. More particularly, it relates to the use of a cheap and plentiful diolefinic compound as a molecular weight increase promoting agent for emulsion polymers.

High molecular weight polymers are very desirable and preferred in most resin compositions. The performance of a resin in surface coatings is, in many respects, a function of its molecular weight. Scrub resistance, abrasion resistance, blocking resistance, tensile strength, hardness and resistance to chemicals are some of the properties enhanced by high molecular weight polymers. In water-based paints, high molecular weight polymers are especially preferred as binders.

It is known that the molecular weight of polymers may be increased by various methods. One of the best known methods is cross linking. Usually a cross linking agent, which acts as a bridge, is added to the polymers and reacted therewith. There are many known cross linking agents. However, in many cases, their applicability to emulsion systems is often limited. In addition, these cross linking agents are rather expensive.

It is an object of this invention to provide a molecular weight increase promoting compound for vinylacrylic emulsion polymers.

Another object of this invention is to provide a molecular weight increase-promoting compound for polymers which is relatively inexpensive, plentiful, and easily controllable.

Other objects of this invention will become clear from further description and examples hereinafter given.

Pursuant to a particular embodiment of this invention, a small but effective quantity of dicyclopentadiene is added to monomers which are subsequently formed into emulsions with de-ionized water containing emulsifiers, surfactants, preservatives, etc., listed below. This emulsion is then polymerized by heating to a temperature of about 65° C. to 90° C. The molecular weights of the resulting emulsion polymers are substantially increased above that of emulsion polymers of the same monomers which are polymerized in the absence of dicyclopentadiene.

Typical monomers contemplated herein are those which contain at least one double bond in the molecule. Preferred monomers are acrylic and methacrylic acids and their esters, such as 2-ethylhexyl acrylate, butyl acrylate, isobutyl acrylate, butyl methacrylate, ethyl acrylate, methyl methacrylate, isobutyl methacrylate. Increased molecular weight of both homo and copolymers are readily obtained from acrylic monomers. Other monomers which may be copolymerized with acrylic monomers to form high molecular weight copolymers include vinyl acetate and styrene. In forming copolymers with these monomers, the ratio of acrylic monomers to vinyl acetate or styrene may range from about 10/90 to 99/1.

Substantially any polyether type surfactant or combination of surfactants in which polyether types predominate has been found to be useful in preparing polymeric emulsions for this invention. This includes anionic, non-ionic and cationic surfactant types, specifically alkyl aryl polyethylene glycol ethers, branch chain alkyl polyethylene glycol ethers, oxyethylated salts, octyl phenoxyethoxyethyldimethylbenzyl ammonium chloride, sodium alkyl aryl ether sulfate, polyethylene glycol tertiary dodecylthioether, propylene oxide-ethylene oxide condensation, etc.

Emulsions containing protective colloids of the polymeric type are subject to the practice of this invention. These protective colloids include hydroxy ethyle cellulose, hydroxy methyl celluose, polyvinyl alcohol starches and starch derivatives, carboxy methyl cellulose, methyl cellulose and analogous water-souble or water-dispersible cellulose derivatives.

Without being restricted or bound in any manner whatsoever by this explanation, it is believed that dicyclopentadiene promotes this increase in molecular weight by adding onto acrylic or styrene terminated growing polymer radicals with each of its double bonds. The polymer chains thus joined have relatively high molecular weights and, accordingly, act to increase the average molecular weight of the product.

In further demonstrating this invention 2-ethylhexyl acrylate will be used as the representative acrylic monomer, although any acrylic or methacrylic monomer listed above could be used; vinyl acetate will be used as the representative non-acrylic monomer, although styrene could be used singly or in combination with the acrylic monomer; and dicyclopentadiene in the preferred quantity of 0.23% by weight of total monomer will be used, although any quantity from 0.01% to 0.50% could be used.

All components are shown as parts by weight unless otherwise stated.

Example I

Example I is an emulsion polymerization of vinyl acetate and 2-ethylhexyl acrylate and is used as the control.

|  | Total | Initial | Delayed addition |
|---|---|---|---|
| Vinyl acetate | 1,317.9 | | |
| 2-ethylhexyl acrylate | 232.5 | | |
| | 1,550.4 | | 1,550.4 |
| Igepal CO-977 (an octylphenoxy-poly-(ethyleneoxy) ethanol of 50 moles of ethylene oxide per molecule) | 30.0 | 30.0 | |
| Igepal CO-897 (an octylphenoxy-poly-(ethyleneoxy) ethanol of 40 moles of ethylene oxide per molecule) | 65.4 | 64.4 | |
| Igepal CO-630 (an octylphenoxy-poly-(ethyleneoxy) ethanol of 9 moles of ethylene oxide per molecule) | 15.0 | 15.0 | |
| Igepal CO-430 (an octylphenoxy-poly-(ethyleneoxy) ethanol of 4 moles of ethylene oxide per molecule) | 9.0 | 9.0 | |
| Nopco NDW (an anti-foam agent composed of a blend of mixed hydrocarbon, metallic soaps and ½ silicone) | 3.0 | 3.0 | |
| Gellosize WP-09 (hydroxyethyl cellulose) | 21.0 | 21.0 | |
| Sodium persulfate | 3.0 | 1.5 | 1.5 |
| De-ionized water | 1,314.0 | 1,164.0 | 150.0 |
| Sodium bicarbonate | 3.0 | 3.0 | |
| | 3,013.8 | | |

The initial components, except for the sodium persulfate, were charged to the reactor and the mass was then sparged with nitrogen for 15–20 minutes. Persulfate was then added and heat was applied. At 65° C., the monomer mixture and initiator solution, e.g. delayed additions, were begun and were carried out over a 4 hour period. Upon completion of both delayed additions, the temperature was increased to 90° C. and maintained for ½ hour. The products were cooled and filtered.

Example II

Example II is the same as control Example I, except that 0.23% by weight of dicyclopentadiene was added to a portion of the monomers and the monomers added in two steps.

The polymer of the emulsion containing dicyclopentadiene had a significantly higher inherent viscosity than the control, e.g. 11.13 and 0.61, respectively. Since the inherent viscosity of a compound reflects its molecular weight, the difference in the relative viscosities of the emulsion polymers of Examples I and II indicates a significant difference in the molecular weights of these two polymers. A series of number average molecular weight determinations, based on osmometry, indicated molecular weights of a number average of 65,400 and 78,900 for the products of Examples I and II, respectively. In other examples, polymers with molecular weights of 100,000 were obtained.

The effect of this molecular weight difference was demonstrated when emulsions of each of these polymers were

|  | Total | Initial | First delay | Second delay |
|---|---|---|---|---|
| Dicyclopentadiene | 3.6 |  | 3.6 |  |
| Vinyl acetate | 1314.0 |  | 328.6 | 985.7 |
| 2-ethylhexyl acrylate | 232.5 |  | 58.1 | 174.7 |
|  | 1550.4 |  | 390.3 | 1160.4 |
| Igepal CO-977 (an octylphenyoxypoly-(ethyleneoxy) ethanol of 50 moles of ethylene oxide per molecule) | 30.0 | 30.0 |  |  |
| Igepal CO-897 (an octylphenoxypoly-(ethyleneoxy) ethanol of 40 moles of ethyleneoxide per molecule) | 65.4 | 65.4 |  |  |
| Igepal CO-630 (an octylphenoxypoly-(ethyleneoxy) ethanol of 9 moles of ethylene oxide per molecule) | 15.0 | 15.0 |  |  |
| Igepal CO-430 (an octylphenoxypoly-(ethyleneoxy) ethanol of 4 moles of ethylene oxide per molecule) | 9.0 | 9.0 |  |  |
| Nopco NDW (an anti-foam agent composed of a blend of mixed hydrocarbon, metallic soaps and ½% silicone) | 3.0 | 3.0 |  |  |
| Cellosize WP-09 (hydroxyethyl cellulose) | 21.0 | 21.0 |  |  |
| De-ionized water | 1314.0 | 1164.0 | 150.0 |  |
| Sodium persulfate | 4.8 | 3.0 | 1.8 |  |
| Sodium Bicarbonate | 3.0 | 3.0 |  |  |
|  | 3015.6 |  |  |  |

The initial components, except for the sodium persulfate, were charged to the reactor and sparged with nitrogen for 15–20 minutes. Aqueous sodium persulfate was then added and heat was applied. At 65° C., portions of the monomer, dicyclopentadiene, and persulfate solution, e.g. first delayed addition, were begun, and except for the persulfate solution, was carried out over a period of about 70 minutes. Additional monomer, e.g. second delayed addition, was added to the emulsion and polymerized over a period of 2 hours and 50 minutes. The addition of the persulfate solution was carried out so as to terminate ten minutes after the end of the second delayed monomer addition.

Upon completion of all delayed additions, the temperature was increased to 90° C. and maintained for ½ hour. The product was cooled and filtered.

TABLE I

|  | Example I | Example II |
|---|---|---|
| Inherent viscosity | 0.61 | 1.13 |
| Unreacted vinyl acetate, percent | 0.25 | 0.28 |
| pH | 4.65 | 4.15 |
| Viscosity, #3 spindle, 20 r.p.m. Brookfield viscosity, cps | 1375 | 1350 |
| Grit larger than 200 mesh (p.p.m.) | 33 | 71 |

Comparison of Example I and Example II shows that the essential difference between them was their molecular weights which is measured by the inherent viscosities.

used as the sole binder in the following emulsion paint formulation:

| | Pounds |
|---|---|
| 2% 4000 cps. Methocel 65 HG sol'n | 155 |
| Potassium tripolyphosphate | 1 |
| Propylene glycol | 25 |
| Tamol 731 (25%) (sodium salt of a polymeric carboxylic acid) | 4 |
| R and R-551 (Lecithin) | 2 |
| PMA-18 (phenyl mercuric acetate) | 0.3 |
| Rutile titanium dioxide | 190 |
| Iceberg (calcined clay) | 100 |
| Snowflake (precipitated calcium carbonate) | 125 |
| Celite 281 (diatomaceous silica) | 25 |
| Nopco NDW (an anti-foam agent composed of a blend of mixed hydrocarbon, metallic soaps and ½% silicone) | 2 |
| Water (add incrementally during pigment addition to maintain heavy paste) | 130 |
| Carbitol acetate | 8 |
| | 767.3 |

The paints were drawn down upon suitable substrates, aged for the same period, and then scrubbed on a Gardner Scrub Tester. The paint containing the polymer of the control emulsion showed an initial film break after 105 scrubs and complete failure after 196 scrubs. The paint containing the polymer of the emulsion in which dicyclopentadiene was included showed an initial film break only after 189 scrubs and complete film failure only after 325 scrubs.

It is to be understood that the foregoing detailed description is given merely by way of illustration and that many variations may be made therein without departing from the spirit of our invention.

The embodiments of the invention in which an exclusive property or privilege is claimed are defined as follows:

1. A process for increasing the molecular weight of emulsion polymers which comprises emulsion polymerizing at least one monomer selected from the group consisting of acrylic acid, ethyl acrylate, butyl acrylate, 2-ethylhexyl acrylate, methyl methacrylate, methacrylic acid, isobutyl acrylate, isobutyl methacrylate, styrene and butyl methacrylate in the presence of minor quantities of dicyclopentadiene in the range from about 0.01 to about 0.50 percent of the total weight of the monomer present and in the presence of free radical polymerization initiators.

2. The process of claim 1 wherein copolymers are produced by emulsion polymerization, said copolymers selected from the group consisting of at least 2 monomers set forth in claim 1; vinyl acetate and at least one monomer set forth in claim 1; and styrene and at least one monomer set forth in claim 1.

3. The process of claim 2 wherein the vinyl acetate copolymer contains from about 60 to about 90 weight percent vinyl acetate and at least one monomer ranges from about 10 to about 40 weight percent based on the total copolymer.

4. The process of claim 2 wherein the styrene copolymer contains from about 30 to 75 weight percent styrene and at least one monomer ranges from about 25 to 70 weight percent based on the total copolymer.

5. A water based paint containing as a binder, the emulsion polymer as produced in claim 1.

6. A water based paint containing as a binder, the emulsion polymer as produced in claim 2.

References Cited

UNITED STATES PATENTS 2,861,050  11/1958  Christenson _____ 260—33.6

JOSEPH L. SCHOFER, Primary Examiner

STANFORD M. LEVIN, Assistant Examiner

U.S. Cl. X.R.

260—80, 86, 88